Sept. 5, 1933.    F. C. NEET    1,925,989
APPARATUS FOR TREATING FRUIT
Filed Feb. 1, 1930
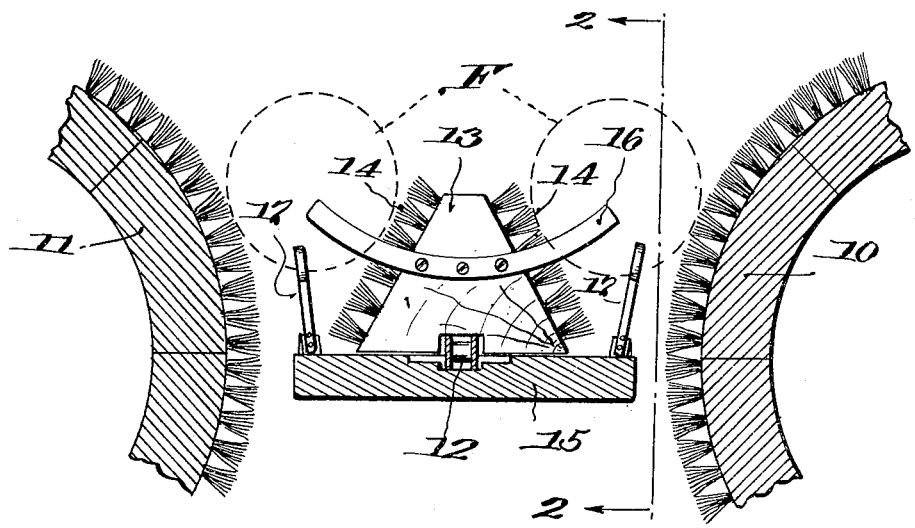
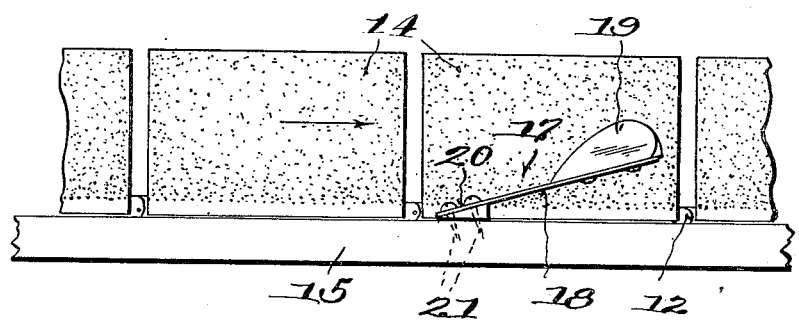
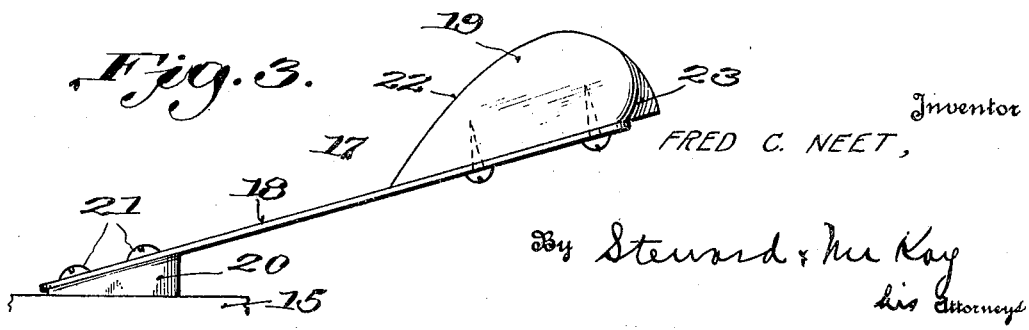
Inventor
FRED C. NEET,
By Steward & McKay
his Attorneys Patented Sept. 5, 1933

1,925,989

UNITED STATES PATENT OFFICE 1,925,989

APPARATUS FOR TREATING FRUIT

Fred C. Neet, Pomona, Calif., assignor to Brogdex Company, Winter Haven, Fla., a corporation of Florida Application February 1, 1930. Serial No. 425,264

2 Claims. (Cl. 146—202)

This invention relates generally to apparatus for treating fruit; and it relates more particularly to apparatus for rubbing or brushing fresh fruit preparatory to marketing the same, the term "fruit" being used to include not only fruit proper but also vegetables.

In preparing fresh fruit for market it is customary to first cleanse the same of undesirable foreign matter and then to polish it, the polishing operation often including the application of a protective coating. In both the cleansing or washing operation and the coating and/or polishing operation, the fruit is generally rubbed or brushed, one of the customary ways being by means of rotating brush rolls which rub or brush the fruit as it is fed therealong.

One of the problems in connection with the rubbing or brushing of fruit is the problem of ensuring that the entire surface of the fruit receives a thorough rubbing or brushing as it goes through the rubbing or brushing unit. It has been found that the rotating brush rolls cause the fruit to spin or rotate as it travels through the apparatus and that this rotation tends to occur principally on a single axis so that portions of the surface of the fruit get little or no brushing.

It is one of the objects of this invention to provide rubbing or brushing apparatus in which the fruit will be caused to rotate or turn about a frequently changing axis so that all portions of the surface of the fruit will be thoroughly rubbed or brushed in its travel through the apparatus.

Another object of the invention is to provide a simple and inexpensive device adapted to cause turning of the fruit, which can be readily associated with standard rubbing or brushing apparatus without requiring any or much change or alteration of said apparatus and which will operate satisfactorily for long periods of time without adjustment or replacement.

A further object of the invention is to provide a device of the character described which will offer little, if any, obstruction to the passage of fruit through the apparatus.

Other objects and novel features and advantages of the invention will become apparent from the following description taken in conjunction with the accompanying drawing which illustrates one practical form of apparatus embodying the invention, it being understood that the description of this specific embodiment is merely illustrative and not restrictive.

In the drawing:

Fig. 1 is a fragmentary end view, in section, of rubbing or brushing apparatus embodying the invention, Fig. 2 is a fragmentary view in side elevation taken on the line 2—2 of Fig. 1, and, Fig. 3 is an enlarged view, similar to Fig. 2, but showing only the fruit-retarding device.

The invention is adapted for use with any rubbing or brushing apparatus, of which there are several types in common use today, in which one of the rubbing or brushing elements is a revolving brush along which the fruit is fed in its travel through the apparatus, but, for convenience, it has been illustrated and described herein as associated with a rubbing or brushing unit of the type illustrated in Brogden Patent No. 1,671,924 comprising parallel rotary brush rolls cooperating with an endless brush conveyor device, which travels longitudinally therebetween, to form runways for supporting fruit.

Referring to the drawing, 10 and 11 indicate two cylindrical brush rolls of a rubbing or brushing unit of the type just referred to. These brush rolls are spaced apart as shown and are suitably journaled at their ends in a supporting framework (not shown) for rotation about their longitudinal axes, the rolls being suitably driven in opposite directions by any suitable means, not shown. Disposed in the space between the brush rolls 10 and 11 is an endless brush and conveyor mechanism adapted, during its upper run or pass, to travel longitudinally of and between the brush rolls 10 and 11 and to cooperate therewith in properly rubbing the fruit while at the same time advancing it toward the delivery end of the unit. This endless brush and conveyor mechanism comprises an endless chain 12 running over two sprockets (not shown), one at each end of the unit, said chain carrying brush blocks indicated generally at 13, which blocks are individually secured to the conveyor chain in any suitable manner. As shown in Fig. 1, said blocks 13 are of generally triangular or inverted V-shaped cross section and each is secured to the conveyor chain 12 on one side or base, the other two sides or inclined lateral faces being provided with a surfacing of brush bristles as indicated at 14. In its upper run, the endless chain brush mechanism slides upon a stationary supporting strip or board 15 which is centrally grooved to receive and guide the conveyor chain 12 to which the brush blocks 13 are secured, each of said brush blocks being similarly grooved or recessed on the side fastened to said chain, as shown. It is apparent that the upper run of the endless brush and conveyor mechanism cooperates with the aforesaid cylindrical brush rolls 10 and 11 to provide two trough-shaped runways for fruit, such fruit being indicated by F. The arrangement of the parts is such that fruit can not fall down through the machine, but is supported in the proper position by the cooperating brush surfaces, as illustrated. The endless brush block mechanism is driven in such manner that the upper pass travels toward the discharge end of the machine as indicated by the arrow in Fig. 2. In order to advance the fruit positively toward the discharge end of the machine, the endless brush block mechanism is provided at suitable intervals with pushers 16, each of which may be secured to one end of a brush block 13 in the space between it and the next block in the series, said pusher projecting into the fruit runways from the opposite inclined faces of the block. These pushers are adapted to engage the fruit as the brush block mechanism advances, thus positively feeding the fruit through the machine.

The fruit to be rubbed or brushed is fed by any suitable means to the runways formed by the cylindrical brush rolls and the brush blocks, where it is subjected to the rubbing action of one of the rotary cylindrical brush rolls on the one hand and of the rectilinearly advancing brush blocks 13 on the other. If desired, the brushing apparatus may be provided with any suitable means for applying a washing or treating liquid or solution and/or a liquid protective material to the fruit as it passes along said runways.

The rotation of the brush rolls tends to cause the fruit to turn or spin and unless the axes upon which this spinning takes place are constantly changed, all portions of the surface of the fruit will not be thoroughly rubbed or brushed. Accordingly, means have been provided to cause the fruits to rotate about frequently changing axes in order that all portions of the surfaces thereof may be thoroughly rubbed or brushed by the moving rubbing or brushing surfaces. These means may take various forms within the scope of the broad invention, but in the present instance they comprise a plurality of projections or "turn-over" devices, indicated generally by 17, arranged at intervals to extend into the path of travel of the fruit through the apparatus, these projections serving to arrest the fruit temporarily and to compel a change in the axis of rotation. In the example illustrated, these projections or fruit-retarding members each comprises a resilient body portion or spring member 18 made from a strip of metal, to one end of which is secured a curved block or end piece 19 which may be made of wood or the like. The other end of the device is secured to a wedge-shaped metallic foot-piece or base 20 by means of screws or similar fastening means 21, said screws also serving to secure the spring device to the chain-supporting strip or board 15. As shown in Fig. 1, the fruit-retarding members are so mounted on the chain rail or board 15, in the spaces between the brush block conveyor and the brush rolls, that they project upwardly into the path of travel of fruit in each of the runways so that the curved blocks or end pieces 19 engage the fruit and arrest or retard its movement sufficiently to compel a change in its axis of rotation. The retarders are made sufficiently resilient to yield to comparably light pressure and thus to avoid injury to the fruit; and for this reason and to avoid displacement of the fruit from the runways, the retarders are preferably arranged to engage only the lower or bottom portions of the fruit. As shown in Fig. 2, the retarders are mounted to project upwardly at an acute angle into the fruit runways so that they will readily yield as the fruit engages and passes over them and if any of the pushers 16 should accidentally come into contact therewith; and from Fig. 3 it will be observed that not only does the body portion or shank 18 project at an acute angle or easy incline into the fruit runway, but that the leading edge 22 of the curved block 19 is also arranged at an easy incline to the path of the fruit so that the device offers little or no obstruction to the passage of the fruit. When the device is engaged by fruit, it is depressed and moves or swings in a line transversely of and substantially vertical to the line of travel of the fruit. As shown in Fig. 1 the retarders are, in the specific embodiment illustrated, mounted to extend at a slight angle to a vertical plane extending longitudinally of the brush rolls and as shown in Fig. 3 the rear edge is beveled at 23 on the side toward the brush roll. Various changes in the construction and arrangement of the retarders can, of course, be made without departing from the broad scope of the invention as expressed in the claims. The use of metal or similar material for the body of the retarder is, however, especially desirable because it does not deteriorate or lose its resiliency when subjected to the conditions which exist when fruit is treated with chemical treating solutions and/or oily or waxy protective materials, which are frequently applied at temperatures much above atmospheric.

What is claimed is:

1. Apparatus for treating fruit comprising the combination, with rubbing means providing a runway for fruit, of a fruit-retarding device arranged to project into the path of travel of fruit in said runway, said device comprising a resilient body portion having a curved end portion adapted to engage said fruit.

2. Apparatus for treating fruit comprising the combination, with rubbing means providing a runway for fruit, of a fruit-retarding device arranged to project into the path of travel of fruit in said runway, said device comprising a metallic spring strip, a wedge-shaped base secured to one end of said strip, and a curved block secured to the other end thereof.

FRED C. NEET.